United States Patent [19]
Hashimoto

[11] Patent Number: 5,982,722
[45] Date of Patent: Nov. 9, 1999

[54] TRACKING SERVO APPARATUS FOR CARRYING OUT TRACKING BY ELIMINATING AN OFFSET COMPONENT FROM AN OUTPUT SIGNAL AND METHOD THEREFOR

[75] Inventor: Minoru Hashimoto, Chiba, Japan

[73] Assignee: Sony Corporation, Tokyo, Japan

[21] Appl. No.: 08/583,099

[22] PCT Filed: May 17, 1995

[86] PCT No.: PCT/JP95/00943

§ 371 Date: Jan. 16, 1996

§ 102(e) Date: Jan. 16, 1996

[87] PCT Pub. No.: WO95/31806

PCT Pub. Date: Nov. 23, 1995

[30] Foreign Application Priority Data

May 17, 1994 [JP] Japan ................................ 6-126937
May 17, 1994 [JP] Japan ................................ 6-126938
Jun. 24, 1994 [JP] Japan ................................ 6-166381

[51] Int. Cl.$^6$ .................................................. G11B 7/095
[52] U.S. Cl. ...................................... 369/44.29; 369/44.34
[58] Field of Search ............................ 369/44.25, 44.27, 369/44.28, 44.29, 44.34, 44.36

[56] References Cited

U.S. PATENT DOCUMENTS

| | | | |
|---|---|---|---|
| 4,849,953 | 7/1989 | Nomura et al. . | |
| 5,113,386 | 5/1992 | Whitehead et al. | 369/44.41 |
| 5,140,573 | 8/1992 | Ando | 369/44.34 X |
| 5,202,870 | 4/1993 | Aoki et al. | 369/44.25 |
| 5,289,447 | 2/1994 | Kobayashi et al. | 369/44.28 |
| 5,416,766 | 5/1995 | Horimai | 369/116 |
| 5,487,056 | 1/1996 | Wachi | 369/44.34 |

FOREIGN PATENT DOCUMENTS

| | | |
|---|---|---|
| 0221782 | 10/1986 | European Pat. Off. . |
| 0305979 A2 | 3/1989 | European Pat. Off. . |
| 61-239436 | 10/1986 | Japan . |
| 62-103854 | 5/1987 | Japan . |
| 1-211326 | 8/1989 | Japan . |
| 3-44826 | 2/1991 | Japan . |
| 3-105733 | 5/1991 | Japan . |
| 3-176824 | 7/1991 | Japan . |
| 6-131680 | 5/1994 | Japan . |

*Primary Examiner*—W. R. Young
*Attorney, Agent, or Firm*—Limbach & Limbach L.L.P.

[57] ABSTRACT

An offset component extracting circuit is supplied with a tracking error signal TE' obtained by using the push-pull method and including an offset component resulting from optical axis deviation, etc. of the object lens followed by tracking. The offset component extracting circuit extracts, from the tracking error signal TE', an offset component included in the tracking error signal itself. A hold circuit outputs offset component S1 delivered from the offset component extracting circuit as offset component S2 as it is for a time period during which servo is in OFF state on the basis of a servo command signal delivered from a system controller to hold the offset component S1 when servo operation changes from OFF state to ON state to output the offset component S1 thus held as offset component S2. A differential amplifier subtracts the offset component S2 from the tracking error signal TE' to deliver a tracking error signal TE from which the offset component S2 has been eliminated to a tracking control circuit through a switch 15. The tracking control circuit includes, e.g., a phase compensation circuit, etc. in the servo control, and drives, e.g., biaxial device of the optical pick-up on the basis of the tracking error signal TE delivered thereto. Thus, tracking servo is applied so that spot of light beam is placed in on-track state.

11 Claims, 10 Drawing Sheets

TRACKING SERVO APPARATUS FOR CARRYING OUT TRACKING BY ELIMINATING AN OFFSET COMPONENT FROM AN OUTPUT SIGNAL AND METHOD THEREFOR

This is a 371 of PCT/JP95/00943, filed May 17, 1995.

TECHNICAL FIELD

This invention relates to a tracking servo apparatus and a track counting apparatus, and more particularly to a tracking servo apparatus, etc., and more particularly to a tracking servo apparatus and a track counting apparatus for (an optical disc unit using) optical recording medium which can reduce offset quantity of the tracking error signal in the so-called push-pull method.

BACKGROUND ART

In optical disc apparatuses (units) using an optical recording medium, e.g., optical disc, the push-pull method is known as one of the methods for detecting tracking error signal used in the tracking servo control.

Figure 1:
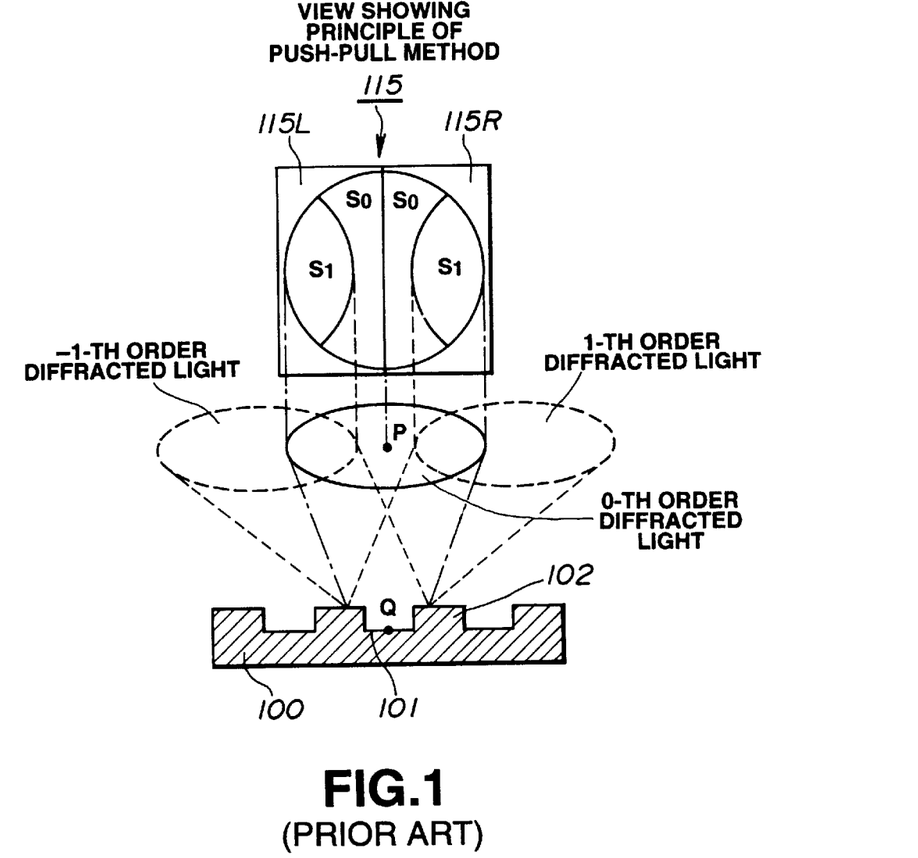
FIG. 1 is a view for explaining the principle of the push-pull method.

FIG. 1 is a view for explaining the principle of the push-pull method. On the base (substrate) of an optical disc 100, grooves 101 and lands 102 are formed in advance as shown in FIG. 1, for example. The push-pull method is a method of detecting, e.g., a light reflected and diffracted at the groove 101 by means of, e.g., a bisected photodetector, 115 of which divided portions are symmetrically disposed with respect to the center of the track to take out an output difference between these detector sections 115L, 115R as a tracking error signal.

In more practical sense, as shown in the FIG. 1 mentioned above, a reflected light from the optical disc 100 mainly consists of (rays of) the 0-th order diffracted light and (rays of) the +±1-th order diffracted light in a direction perpendicular to the groove 101. In view of the above, respective detector sections 115L, 115R of the bisected photodetector 115 are disposed symmetrically with respect to the center of the track to respectively detect, by means of these detector sections 115L, 115R, sum total of intensities of the 0-th order light +(+1)-th order light and sum total of the 0-th order light +(−1)-th order light, i.e., sum total of intensities of the area $S_0$ where only the 0-th order diffracted light exists and the area $S_1$ where the 0-th order diffracted light and the 1-th order diffracted light exist and sum total of intensities of the above-mentioned area $S_0$ and the area $S_1$ where the 0-th order diffracted light and the (−1)-th order diffracted light exist. Then, a difference between respective outputs of the detector sections 115L, 115R is determined by, e.g., a differential amplifier, thereby making it possible to obtain a tracking error signal.

Figure 2:
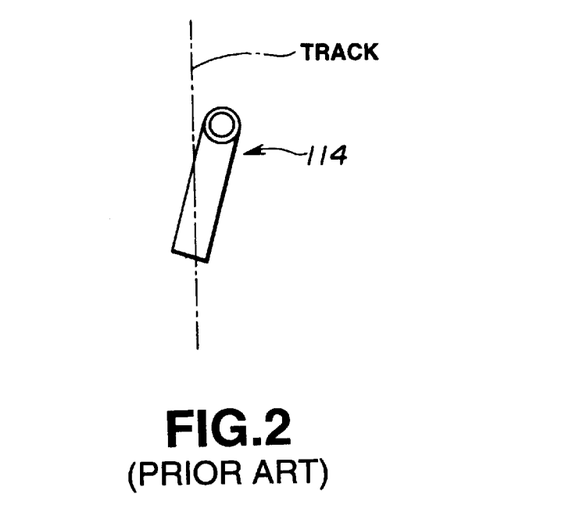
FIG. 2 is a schematic diagram showing the state of visual field fluctuation of the optical pick-up.

Meanwhile, in the push-pull method, as shown in FIG. 2, for example, any offset takes place in the tracking error signal resulting from movement of an objective (object lens) 114 followed by tracking (so called fluctuation (change) of the visual field of the objective) and/or inclination in the radial direction of the optical disc, etc.

Figure 3:
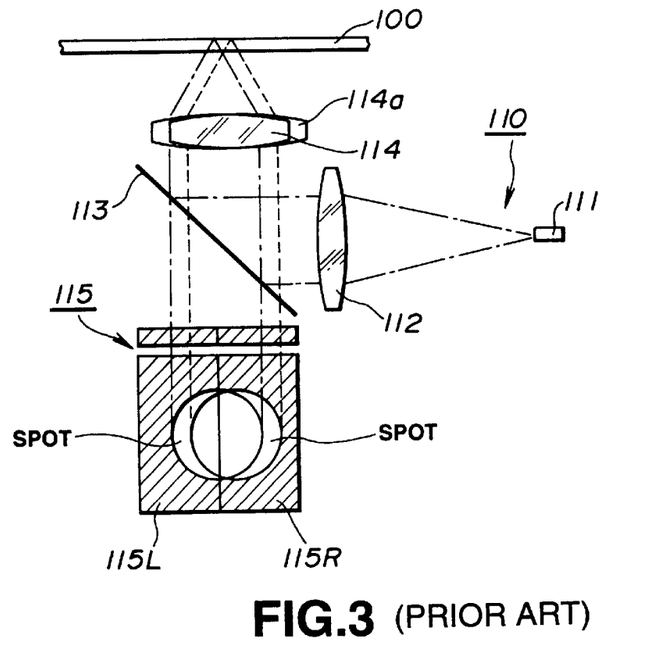
FIG. 3 is a view showing the drawback of the push-pull method.

In more practical sense, as shown in FIG. 3, for example, light beams emitted from a semiconductor laser 111 of the so-called optical pick-up 110 are changed into rays of parallel light by a collimator lens 112, and are then reflected on a beam splitter 113. The (rays of) reflected light thus obtained is converged onto the optical disc 100 by the objective 114. The light beams reflected on the optical disc 100 return through the light traveling (incoming) path in a manner opposite to the above and are transmitted through the beam splitter 113. Thereafter, these light beams are received by the bisected photodetector 115. In this case, in the system of moving only the objective 114 in a direction perpendicular to the optical axis to carry out tracking, when the objective 114 is assumed to be moved to the position indicated by reference numeral 114a, spot of diffracted light would deviate with respect to the center of the bisected photodetector 115. As a result, any d.c. offset might take place in the tracking error signal.

Figure 4:
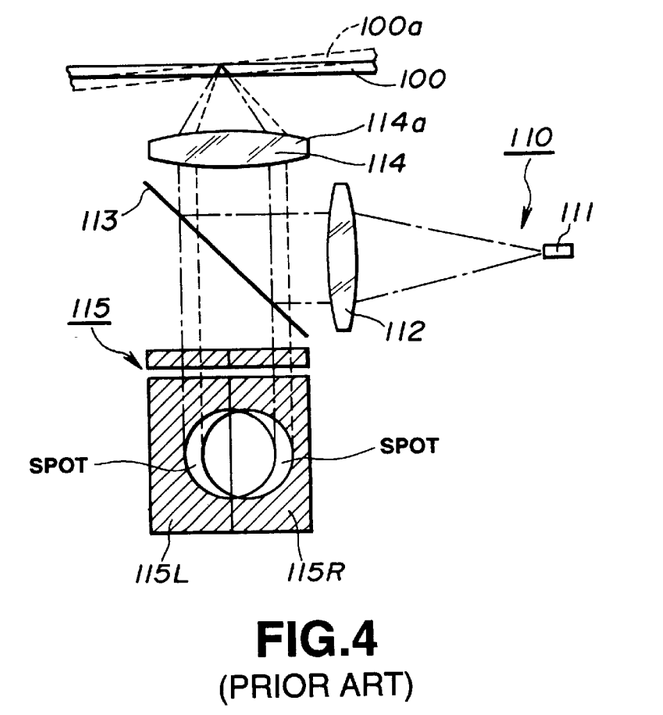
FIG. 4 is a view showing the drawback of the push-pull method.

Moreover, as shown in FIG. 4, for example, when the optical disc 100 is assumed to be inclined as indicated by reference numeral 100a, spot of the diffracted light would deviate with respect to the center of the bisected photodetector 115 in a manner similar to the above. Thus, any offset is produced in the tracking error signal. As a result, even if the center of the objective 114 is located on the center of the track, a tracking error signal of which value is not zero is detected, thus failing to carry out precise tracking servo.

Moreover, in optical disc apparatuses adapted for counting the number of tracks that light beams traverse (cross) on the basis of a tracking error signal in the so-called. track jump or seek, if any offset exists in the tracking error signal as described above, it is impossible to precisely count the number of tracks.

Figure 5:
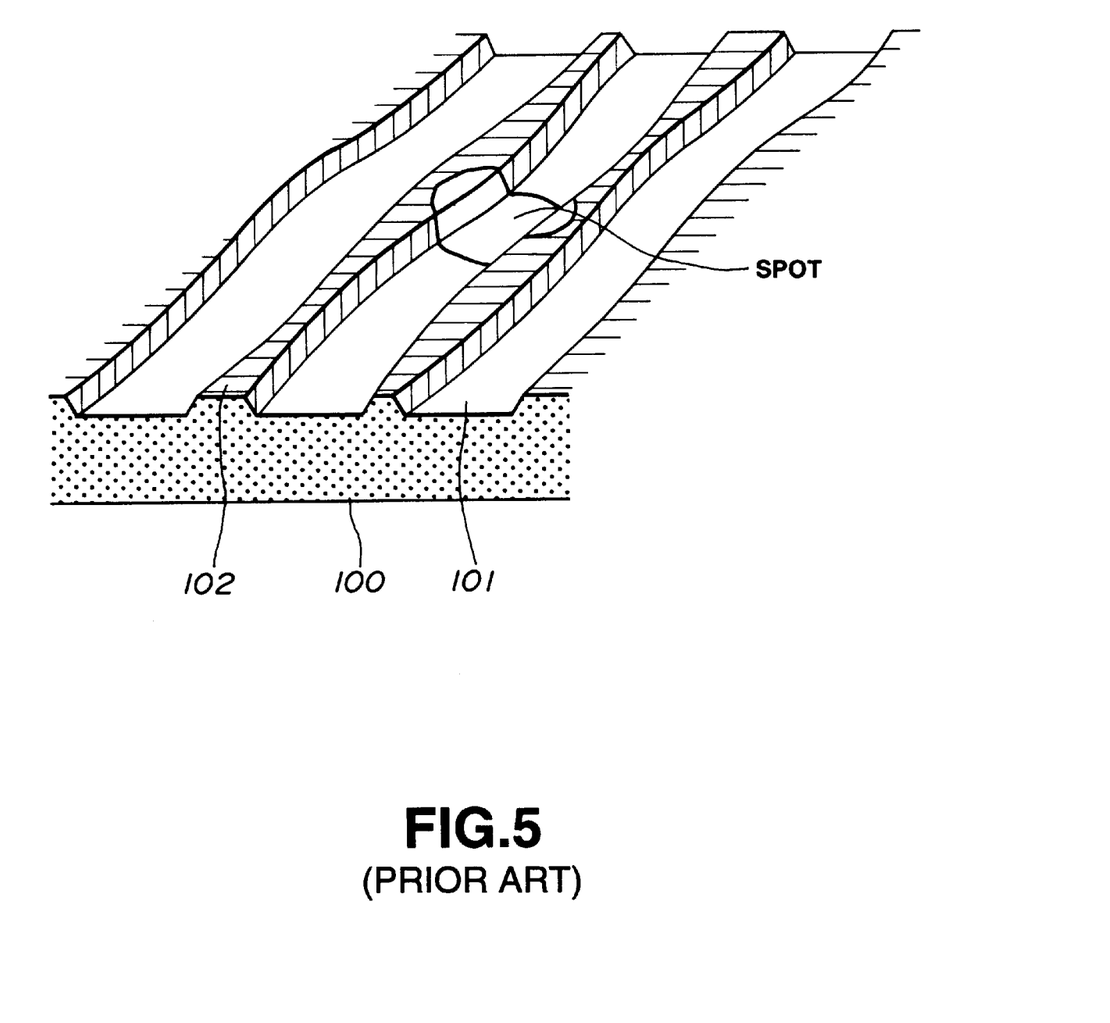
FIG. 5 is a view showing a wobbled track.

In view of the above, in order to eliminate the offset component of the tracking error signal, in the conventional tracking servo apparatus, there is employed a mechanical mechanism such that visual field fluctuation (change) of the objective resulting from, such as, for example, movement of the optical system constituting the optical pick-up or that of the entirety of the optical pick-up, etc. does not take place. In addition, an approach is employed, as shown in FIG. 5, for example, to eliminate the offset component by information except for the tracking error signal, i.e., to wobble the grooves 101 on the basis of address information to cancel (eliminate) the offset component of the tracking error signal, e.g., by difference between amplitudes of wobble (wobbling) components detected by respective detector sections of the bisected photodetector.

However, in both cases, there is the problem that cost is increased for the purpose of realizing them. In addition, in the method of canceling the offset component of the tracking error signal by the wobble component, there is the problem that since it is impossible to precisely detect the wobble component unless the disc apparatus is in the on track state, it is impossible to precisely detect the number of tracks that light beams traverse.

This invention has been made in view of actual circumstances as described above, and its object is to provide a tracking servo apparatus and a track counting apparatus which can lessen offset quantity of the tracking error signal resulting from movement of the objective (object lens) followed by tracking and/or inclination of the optical disc, and which can precisely detect the number of tracks that spots of the light beams traverse.

DISCLOSURE OF THE INVENTION

A tracking servo apparatus for an optical recording medium according to this invention comprises a light detector including at least two detecting sections disposed with the center of a track of the optical recording medium being put therebetween, tracking error signal generating means for taking a difference between output signals from the respective detecting sections of the light detector to thereby generate a tracking error signal, extracting means for extracting an offset component from an output signal from the tracking error signal generating means, holding means for holding the offset component outputted from the extracting means, and offset eliminating means for eliminating the offset component in the tracking error signal from the tracking error signal generating means on the basis of the offset component from the holding means.

Moreover, a tracking servo apparatus for an optical recording medium according to this invention comprises a light detector including at least two detecting sections disposed with the center of a track of the optical recording medium being put therebetween, and adapted for detecting a return light beam from the optical recording medium of a single light beam irradiated in the state converged onto the track of the optical recording medium by the two detecting sections; tracking error signal generating means for taking a difference between output signals from the light detecting sections to thereby generate a tracking error signal; extracting means for extracting an offset component from an output signal from the tracking error signal generating means; holding means for holding the offset component outputted from the extracting means; offset eliminating means for eliminating the offset component in the tracking error signal from the tracking error signal generating means on the basis of the offset component from the holding means; and tracking control means for carrying out a tracking control of a single light beam irradiated onto the optical recording medium on the basis of an output signal from the offset eliminating means.

Moreover, a tracking servo apparatus for an optical recording medium according to this invention comprises a light detector having at least two detecting sections disposed with the center of a track meandered (wobbled) with respect to the scanning direction of light beams of the optical recording medium being put therebetween, tracking error signal generating means for taking a difference between output signals from the respective detecting sections of the light detector to thereby generate a tracking error signal, first offset eliminating means operative so that when the tracking control operation is in the operative state, it eliminates an offset component of the tracking error signal from the tracking error signal generating means, second offset eliminating means operative so that when the track control operation is in the inoperative state, it eliminates the offset component of the tracking error signal from the tracking error signal generating means, and tracking control means operative so that when the tracking control operation is in the operative state, it is selectively supplied with an output signal from the first offset eliminating means, while when the tracking control operation is in the inoperative state, it is selectively supplied with an output signal from the second offset eliminating means to carry out tracking control on the basis of the delivered output signal.

A track counting apparatus for an optical recording medium according to this invention comprises a light detector having at least two detecting sections disposed with the center of a track of an optical recording medium being put therebetween and adapted to detect return beams of light beams irradiated onto the optical recording medium, tracking error signal generating means for taking a difference between output signals from the respective detecting sections of the light detector to thereby generate a tracking error signal, extracting means for extracting an offset component from an output signal from the tracking error signal generating means, and counting means for counting the number of tracks when a light beam irradiated onto the optical recording medium traverses the track of the optical recording medium on the basis of an output signal from the extracting means and an output signal from the tracking error signal generating means.

BEST MODE FOR CARRYING OUT THE INVENTION

Embodiments of a tracking servo apparatus for an optical recording medium and a track counting apparatus for an optical recording medium according to this invention will now be described with reference to the attached drawings.

Figure 6:
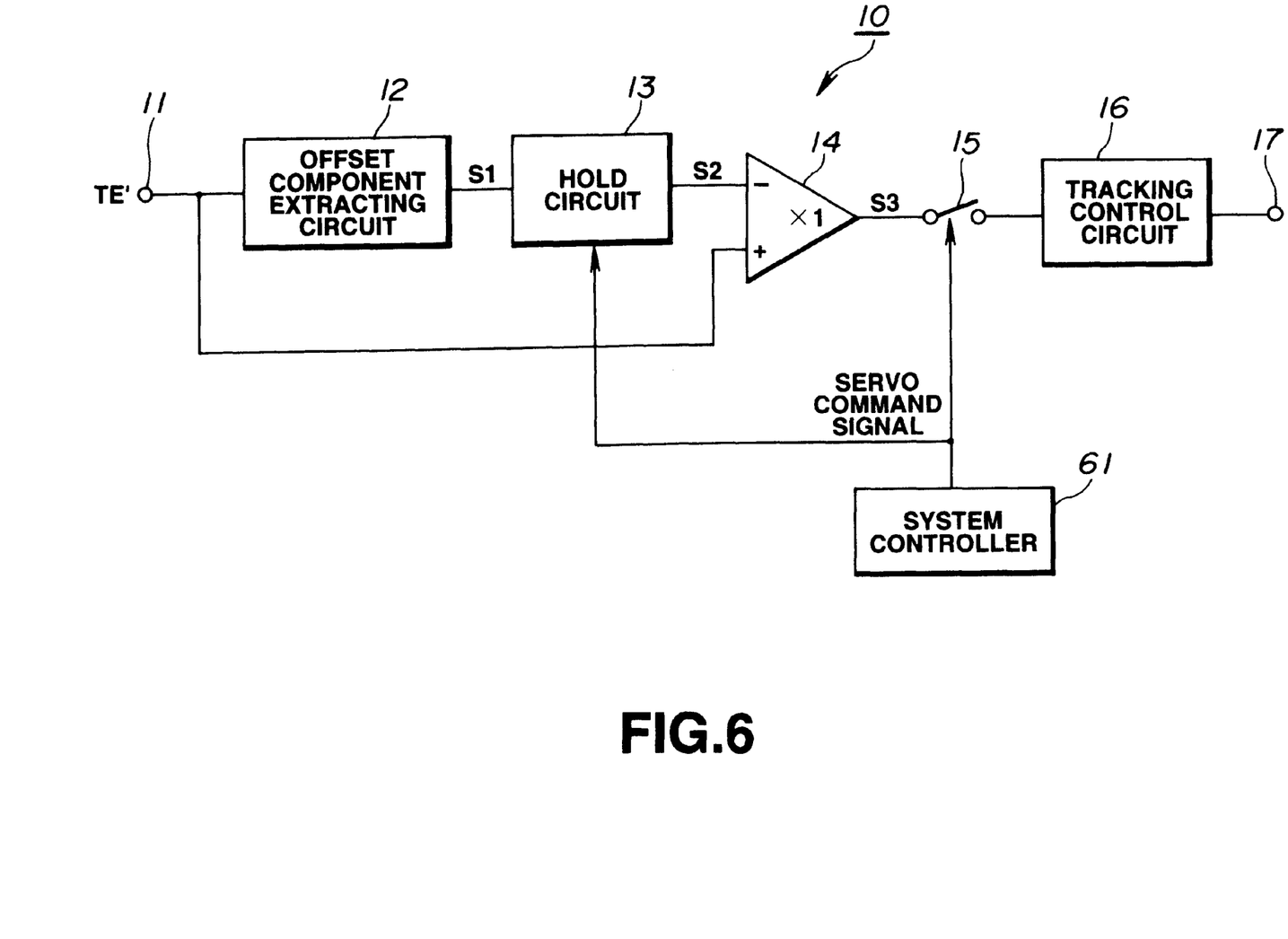
FIG. 6 is a block diagram showing a more practical circuit configuration of a tracking servo apparatus to which this invention is applied.

FIG. 6 is a block diagram showing a more practical circuit configuration of the tracking servo apparatus to which this invention is applied.

As shown in FIG. 6, the tracking servo apparatus 10 to which this invention is applied comprises an offset component extracting circuit 12 for extracting an offset component from a tracking error signal TE' including offset component, a hold circuit 13 for holding the offset component extracted at the offset component extracting circuit 12, a differential amplifier 14 for subtracting the offset component held at the hold circuit 13 from the tracking error signal TE' to generate a tracking error signal TE from which the offset component has been eliminated, a switch 15 for opening the loop of the feedback control system, and a tracking control circuit 16 for driving the biaxial device of the so-called optical pick-up on the basis of the tracking error signal TE delivered through the switch 15.

The offset component extracting circuit 12 is supplied with the track error signal TE' obtained by the so-called push-pull method through terminal 11. Namely, the offset component extracting circuit 12 is supplied with the tracking error signal TE' obtained, e.g., by taking a difference between output signals of respective detector sections of a photodetector having at least two detector sections which will be described later and including an offset component, e.g., resulting from the optical axis deviation, etc. of the objective (object lens) followed by tracking. Thus, the offset component extracting circuit 12 extracts, from the tracking error signal TE', the offset component included in the tracking error signal TE' itself.

Figure 7:
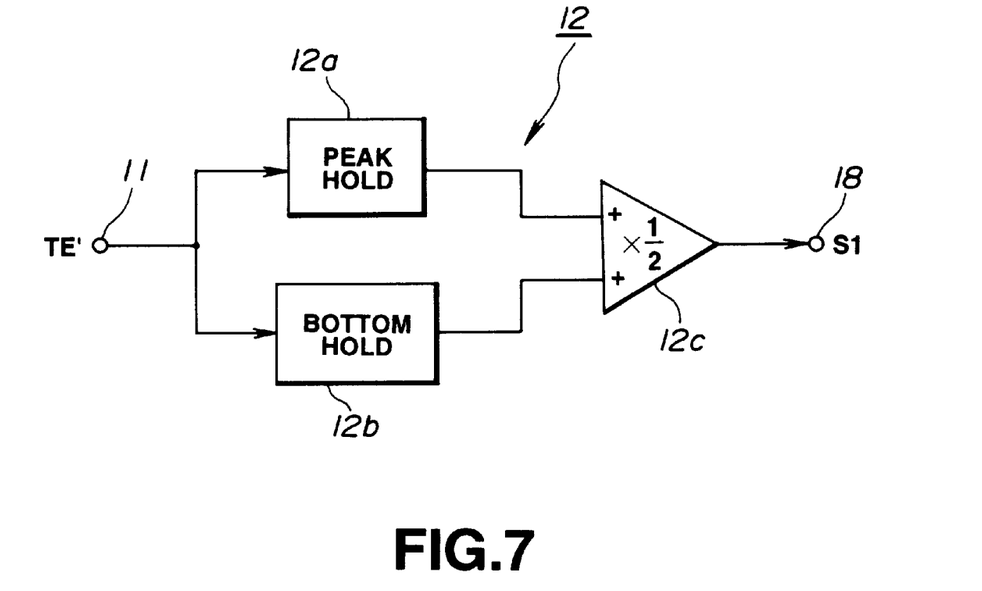
FIG. 7 is a block diagram showing a more practical circuit configuration of an offset component extracting circuit constituting the tracking servo apparatus.

In more practical sense, the offset component extracting circuit 12 comprises, as shown in FIG. 7, for example, a peak hold circuit 12a for holding the peak value of the tracking error signal TE', a bottom hold circuit 12b for holding the bottom value of the tracking error signal TE', and an operation (calculating) circuit 12c for determining (calculating) an average value of the peak value from the peak hold circuit 12a and the bottom value from the bottom hold circuit 12b.

Figure 8:
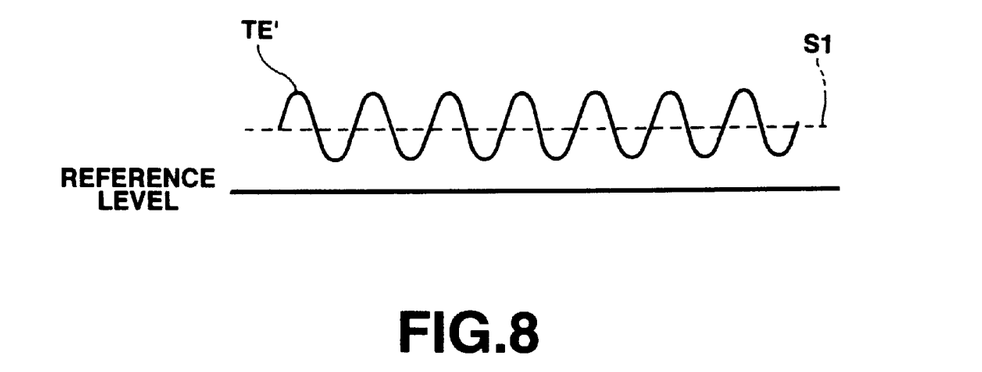
FIG. 8 is a view for explaining the operation of the offset component extracting circuit.

For example, in the so-called track jump or seek, when spot of a light beam emitted from the optical pick-up traverses the track, the tracking error signal TE' delivered through the terminal 11 becomes a signal in which so called S-shaped curves are periodically continuous as shown in FIG. 8, for example. The peak hold circuit 12a detects and holds a peak value (maximum value) of the tracking error signal TE' every period of the tracking error signal TE' to deliver the peak value held therein to the operation circuit 12c. In addition, the bottom hold circuit 12b detects and holds a bottom value (minimum value) of the tracking error signal TE' every period of the tracking error signal TE' to deliver the bottom value held therein to the operation circuit 12c.

The operation circuit 12c adds the peak value from the peak hold circuit 12a and the bottom value from the bottom hold circuit 12b to multiply the added value by ½ to thereby determine an average value of the peak value and the bottom value. Namely, as shown in the FIG. 8 mentioned above, the operation circuit 12c determines an offset component S1 of the tracking error signal TE' with respect to the level of the tracking error signal when the offset component is zero (hereinafter referred to as reference level) to deliver the offset component S1 to the hold circuit 13 through a terminal 18.

Figure 9:
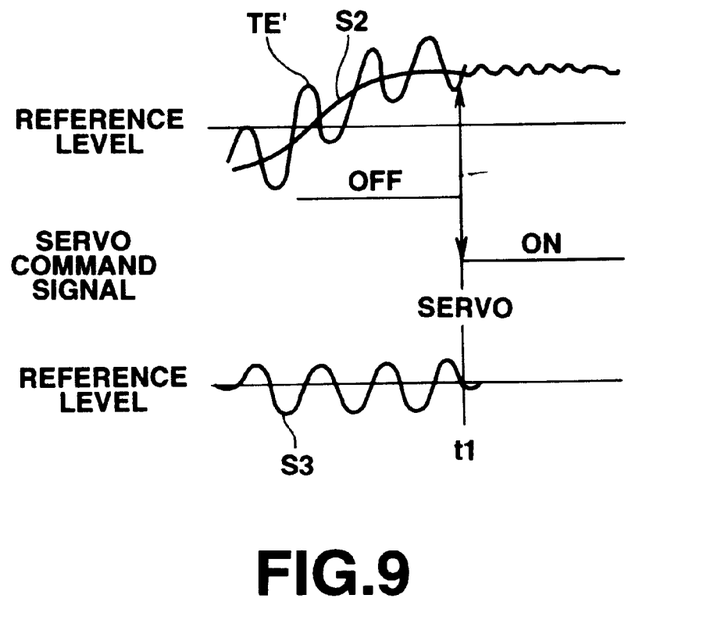
FIG. 9 is a view for explaining the operation of the offset component extracting circuit.

The hold circuit 13 holds the offset component S1 delivered from the operation circuit 12c on the basis of a servo command signal delivered from a system controller 61 which controls the entirety of the optical disc apparatus using, e.g., the above-mentioned tracking servo unit. Namely, the system controller 61 is operative so that when it carries out write/readout, etc. of data with respect to the optical disc, it allows the servo command signal to be at L level in order to allow the tracking servo control to be turned ON, i.e., in order to close the loop of the feedback system, and when it allows the optical pick-up to seek for a target (objective) track, or the like, it allows the servo control signal to be at H level in order to allow the tracking servo control to be turned OFF, thus to output the servo command signal of the corresponding level. Further, the hold circuit 13 is operative as shown in FIG. 9, for example, so that for a time period during which the servo command signal is at H level (servo is in OFF state), it outputs, as the offset component S2, as it is, the offset component S1 delivered from the offset component extracting circuit 12, and when the servo command signal changes from H level (servo is in OFF state) to L level (servo is in ON state) at time t1, it holds the offset component S1 at the time t1 to output, as the offset component S2, the offset component S1 at the time t1 thus held to the differential amplifier 14.

This differential amplifier 14 is supplied with the tracking error signal TE' through the terminal 11. Thus, the differential amplifier 14 is operative as shown in the FIG. 9 mentioned above, for example, to subtract the offset component S2 from the tracking error signal TE', i.e., to eliminate the offset component S2 from the tracking error signal TE' to deliver, as a tracking error signal S3 (or hereinafter referred to as a tracking error signal TE), the tracking error signal TE' from which the offset component S2 has been eliminated (canceled) to the switch 15.

The switch 15 is controlled on the basis of the servo command signal delivered from the system controller 61, and is operative so that when the servo command signal is at L level (servo is in ON state), it delivers, to the tracking control circuit 16, a tracking error signal TE from which the offset component has been eliminated from the differential amplifier 14.

The tracking control circuit 16 includes, e.g., phase compensating circuit, gain amplifier, power amplifier (driver) and the like in the servo control, and drives, e.g., the biaxial device of the optical pick-up on the basis of the tracking error signal TE delivered through the switch 15.

Thus, the tracking servo is applied so that spot of light beam is placed in on track state. In the tracking servo unit (apparatus) to which this invention is applied, as described above, when, e.g., a track jump is completed so that the tracking servo is turned ON, an approach is employed to extract, from the tracking error signal TE', the offset component of the signal TE itself to hold it to eliminate such offset component from the tracking error signal TE' to carry out tracking servo control, thereby making it possible to precisely apply (carry out) tracking servo without providing a mechanical mechanism adapted so that fluctuation of the visual field of the objective (object lens) does not take place and/or any circuit for eliminating offset component based on information except for tracking error signal, etc, i.e., without requiring expense. In addition, in this tracking servo apparatus, since the offset component is not caused to be a lower frequency component of the tracking error signal TE', the lower frequency component is included in the tracking error signal TE from which the offset component has been eliminated. Accordingly, it is possible to apply (carry out) tracking servo without lowering the gain in the lower frequency band in the servo control.

Further, this tracking servo unit can carry out tracking servo control by single spot as described above, and is particularly effective, e.g., in the magneto-optical disc unit, etc. in which there is no effective method for canceling (eliminating), at all times, offset component of the tracking error signal by the push-pull method.

Figure 10:
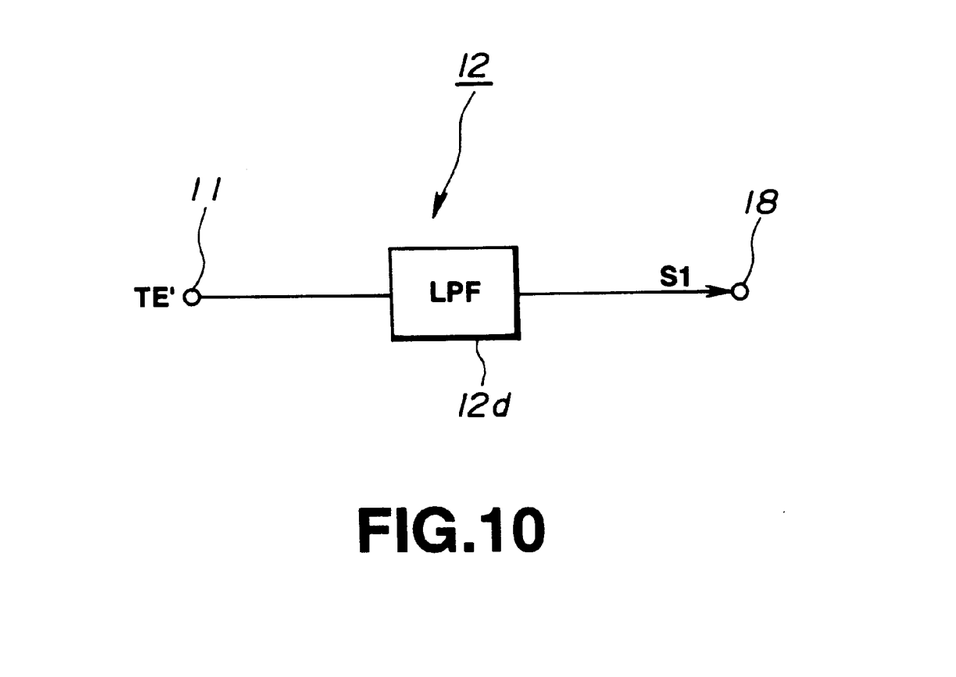
FIG. 10 is a block diagram showing another more practical circuit configuration of the offset component extracting circuit.

Meanwhile, the offset component extracting circuit 12 is not limited to the circuit of the structure shown in FIG. 7 mentioned above, but may be low-pass filter (hereinafter abbreviated as LPF) 12d as shown in FIG. 10, for example. In this case, when so called cut-off frequency of the LPF 12d and frequency of the offset component included in the tracking error signal TE' are close to each other, any phase shift takes place, thus failing to precisely extract the offset component. Accordingly, setting is assumed to be made such that the cut-off frequency of the LPF 12d is equal to an optimum value by taking the frequency of offset component and/or gain in the lower frequency of the servo control, etc. into consideration.

Figure 11:
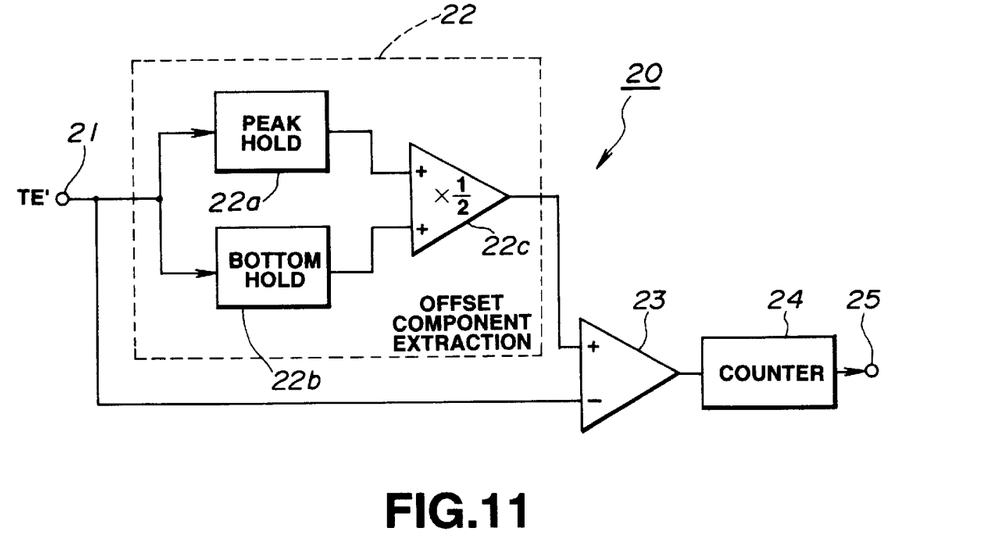
FIG. 11 is a view showing a more practical circuit configuration of a track counting apparatus to which this invention is applied.

The track counting unit (apparatus) to which this invention is applied will now be described. FIG. 11 is a block diagram showing a more practical circuit configuration of a tracking servo unit (apparatus) to which this invention is applied.

As shown in FIG. 11, track counting unit 20 to which this invention is applied comprises a peak hold circuit 22a for holding a peak value of the tracking error signal TE', a bottom hold circuit 22b for holding a bottom value of the tracking error signal TE', an operation circuit 22c for determining an average value of the peak value from the peak hold circuit 22a and the bottom value from the bottom hold circuit 22b to output it as the offset component, a comparator 23 for comparing the track error signal TE' and the offset component from the operation circuit 22c, and a counter 24 for counting outputs of the comparator 23.

Figure 12:
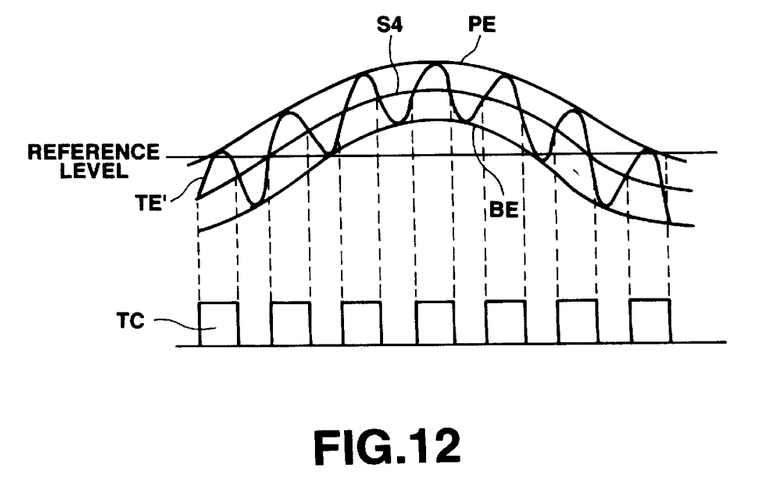
FIG. 12 is a view for explaining the operation of the track counting apparatus.

As described above, when spot of light beam emitted from the optical pick-up traverses a track, e.g., in the track jump, etc., since the tracking error signal TE' delivered through a terminal 21 includes offset component, as shown in FIG. 12, for example, and is a signal in which S-shaped curves are periodically successive so that one period corresponds to EL track to be traversed, the peak hold circuit 22a detects and holds the peak value of the tracking error signal TE' every period of the tracking error signal TE' to deliver the peak value thus held to the operation circuit 22c. Moreover, the bottom held circuit 22b detects and holds the bottom value of the tracking error signal TE' every period of the tracking error signal TE' to deliver the bottom value thus held to the operation circuit 22c. Namely, as shown in the FIG. 12 mentioned above, the peak hold circuit 22a outputs a value approximate to an upper envelope PE of the tracking error signal TE', and the bottom hold circuit 22b outputs a value approximate to the lower envelope BE.

The operation circuit 22c adds the peak value from the peak hold circuit 22a and the bottom value from the bottom hold circuit 22b thereafter to multiply the added value by ½ to thereby determine an average value of the peak value and the bottom value. Namely, as shown in the FIG. 12 mentioned above, the operation circuit 22c determines offset component S4 included in the tracking error signal TE' with respect to the reference level to deliver the offset component S4 thus determined to a comparator 23.

This comparator 23 is supplied with the tracking error signal TE' through the terminal 21. Thus, the comparator 23 compares the tracking error signal TE' and the offset component S4 to deliver, to a counter 24, a signal TC which is caused to be at H level when the tracking error signal TE' is greater than the offset component S4 as shown in the FIG. 9 mentioned above, for example. The counter 24 counts the signals TC of H level to thereby count the number of tracks that spot of light beam in the track jump, etc. traverses. Then, the counter 24 delivers the number of tracks which has been counted to the system controller 61 through a terminal 25.

Namely, in the track count unit to which this invention is applied, even if any offset resulting from, e.g., inclination of the optical disc, etc. exists in the tracking error signal TE', it is possible to precisely detect the number of tracks in the track jump or seek on the basis of the tracking error signal TE' generated by the push-pull method.

Meanwhile, in the tracking servo apparatus of the configuration shown in the FIG. 6 mentioned above, even if any offset exists in a tracking error signal obtained by the push-pull method, when the tracking servo is turned ON, spot of light beam is permitted to be caused in the on track state. However, in the case where position of the objective (object lens) is moved followed by tracking, the offset component value held at the hold circuit 13 takes a value which is not correct. Explanation will now be given in connection with a tracking servo apparatus (unit) in which the technology for eliminating offset component by using a diffracted light from meandered (so called wobbled) groove on the basis of, e.g., address information, the above-described tracking servo unit and the above-described track counting unit are employed in view of the above.

Figure 13:
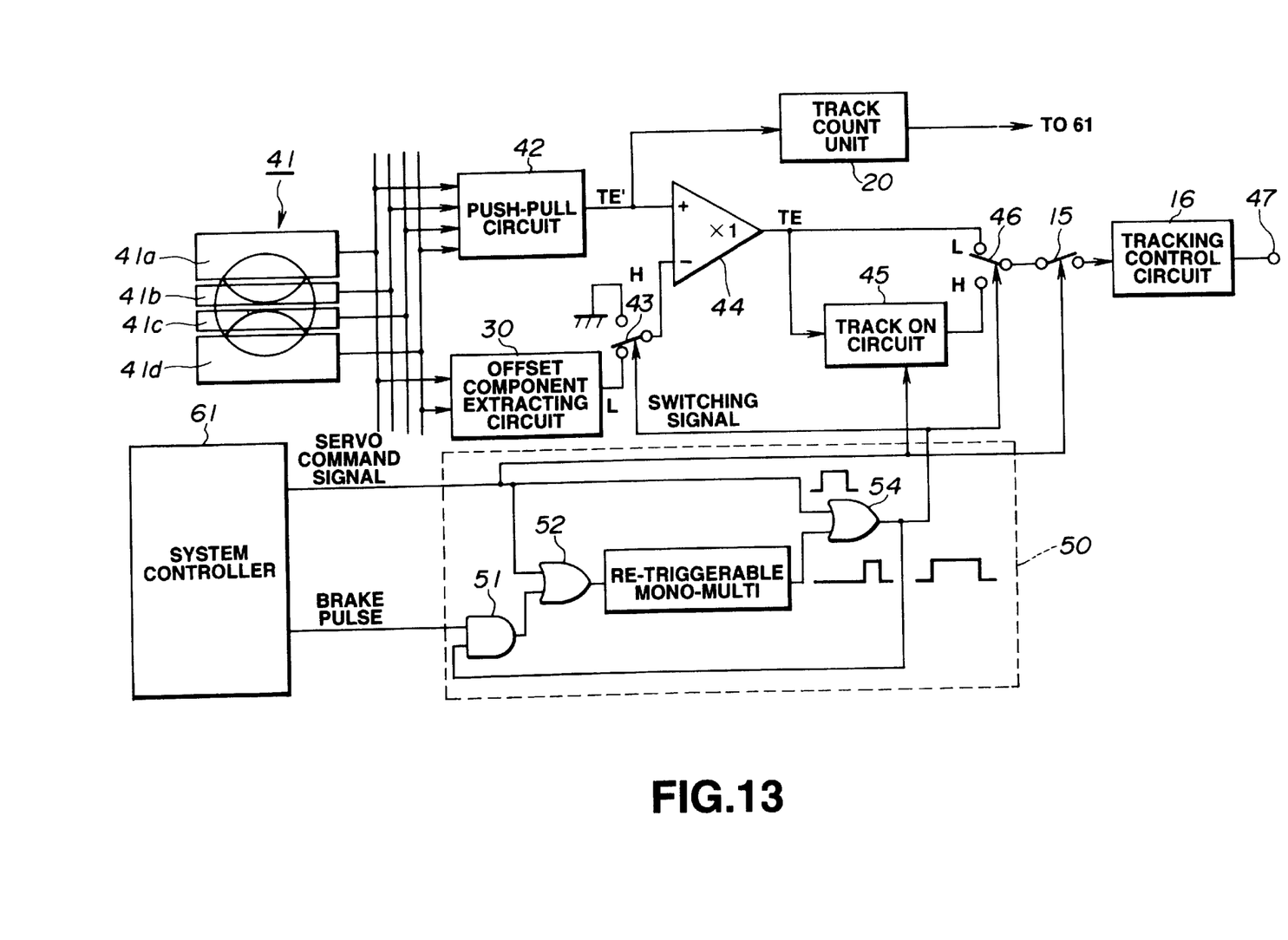
FIG. 13 is a view showing a more practical circuit configuration of a tracking servo apparatus to which this invention is applied.

This tracking servo apparatus comprises, as shown in FIG. 13, for example, a photodetector 41 having at least two detector sections, a push-pull circuit 42 for taking a difference between output signals of the respective detecting sections of the photodetector 41 to thereby generate a tracking error signal TE', an offset component extracting circuit 30 for extracting the offset component on the basis of, e.g., wobble component of the tracking error signal TE', a differential amplifier 44 for subtracting the offset component from the offset component extracting circuit 30 from the tracking error signal from the push-pull circuit 42 to generate a tracking error signal TE from which the offset component has been eliminated, a track on circuit 45 for generating a tracking error signal TE immediately after the tracking servo is turned ON, a select switch 46 for carrying out selective-switching between the tracking error signal TE from the differential amplifier 44 and the tracking error signal TE from the track on circuit 45, switch 15 for opening the loop of the feedback control system, tracking control circuit 16 for driving the biaxial device of the optical pick-up on the basis of the tracking error signal TE supplied through the switch 15, a timing circuit 50 for controlling the selective switching operation of the select switch 46, etc., and the above-described track counting unit 20.

It is to be noted that the same reference numerals are respectively attached to the same circuits as the circuits shown in FIGS. 6 and 11, and their explanation will be omitted.

Initially, the timing circuit 50 will be described.

This timing circuit 50 includes, as shown in the FIG. 13 mentioned above, for example, a re-triggerable mono-multi vibrator 53, etc. for delaying, by a predetermined time, a servo command signal of H level from the system controller 61. This timing circuit 50 generates, as shown in FIGS. 15A–15D, for example, a servo command signal delivered from the system controller 61 or a switching signal which falls after a predetermined time is passed from the time point when a brake pulse falls.

In more practical sense, an AND circuit 51 determines logical product of the brake pulse for stabilizing the biaxial device (i.e., placing it in the steady-state) immediately after track jump from the system controller 61 and the switching signal to mask the brake pulse when the circuit is in the tracking servo state. An OR circuit 52 determines logical sum of the servo command signal from the system controller 61 and an output of the AND circuit 51 to start the re-triggerable mono-multi vibrator 53 in response to (i.e., in synchronism with) falls of the servo command signal and the brake pulse.

The re-triggerable mono-multi vibrator 53 has, e.g., time constant of 5 ms, and is operative to start in response to fall of an output signal of the OR circuit 52, and to output a pulse signal which is caused to be at H level for 5 ms with the last falling (of pulse) being as reference. Namely, the re-triggerable mono-multi vibrator 53 starts, as shown in the FIGS. 15B–15D mentioned above, for example, in response to the falling of the servo command signal and the falling of the brake pulse at the time t1 to output a signal of H level for a time period from the last falling of the brake pulse up to the time when 5 ms is passed.

Figure 15A:
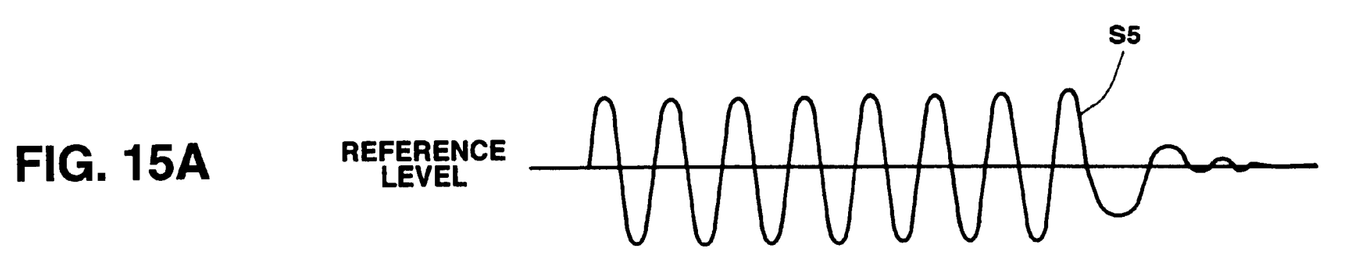
FIGS. 15A–15D are views for explaining the operation of the tracking servo apparatus.
Figure 15B:
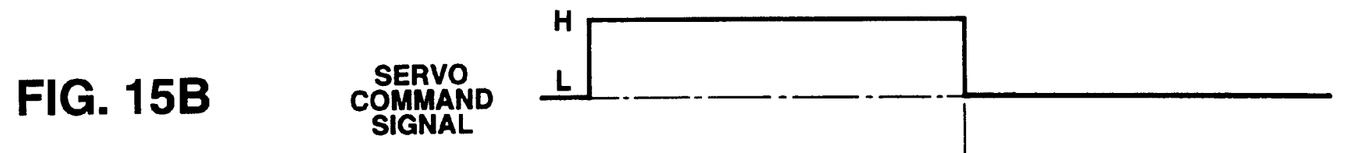
Figure 15C:
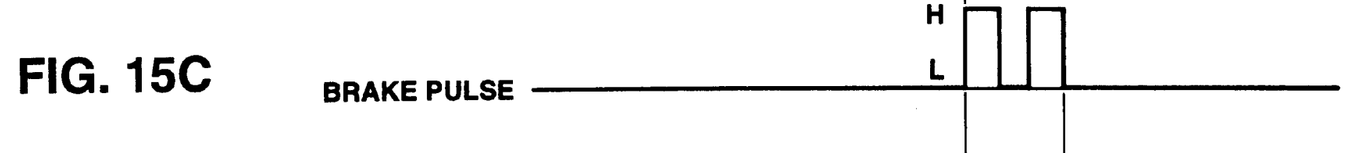
Figure 15D:
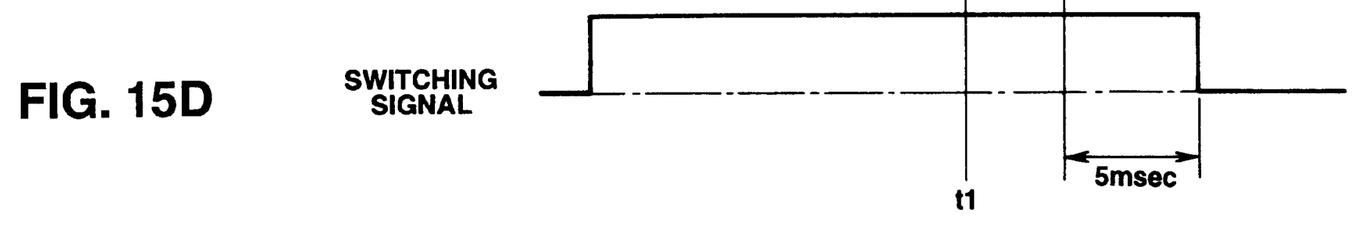

An OR circuit 54 determines logical sum of the servo command signal from the system controller 61 and an output signal of the re-triggerable mono-multi vibrator 53 to thereby output, as shown in the FIGS. 15A and 15D mentioned above, for example, a switching signal which rises in response to rising of the servo command signal and falls in response to falling of an output of the re-triggerable mono-multi vibrator 53. Namely, this switching signal is caused to be at H level in synchronism with rising of the servo command signal (tracking servo is in OFF state), and is caused to be at L level in a manner delayed by a predetermined time from falling of the servo command signal (tracking servo is in ON state).

The timing circuit 50 controls the track on circuit 45 and the switch 15 by the servo command signal, and controls select (changeover) switches 43, 46 by the switching signal. In more practical sense, the select switch 43 is operative so that when the switching signal is at L level, it selects an output signal of the offset component extracting circuit 30 to output it, while when the switching signal is at H level, it outputs a signal of L level. Namely, the select switch 43 is operative as shown in FIG. 15B, for example, so that when the tracking servo is in ON state (the servo command signal is at L level), it selects an output signal of the offset component extracting circuit 30 to output it, and after the tracking servo is brought into OFF state (the servo command signal is caused to be at L level), it outputs a signal of L level for a time period during which the switching signal is at H level.

Moreover, the select switch 46 is operative, as shown in FIG. 15B, for example, so that when the tracking servo is in ON state (the servo command signal is at L level), it; selects an output signal of the differential amplifier 44 to output it, and after the tracking servo is brought into OFF state (the servo command signal is caused to be at H level), for a time period during which the switching signal is at H level, it selects an output signal of the track on circuit 45 to output it.

Further, the switch 15 is operative, as shown in FIG. 15B, for example, so that when the tracking servo is ON state (the servo command signal is at L level), it closes the loop of the feedback system, while when the tracking servo is in OFF state (the servo command signal is at H level), it opens the loop of the feedback system.

The operation of the entirety of the tracking servo apparatus will now be described.

The optical disc used in the optical disc device employing the tracking servo unit has tracks wobbled with respect to the scanning direction of light beams on the basis of, e.g., address information or clock information as explained with reference to FIG. 5 in the background art, wherein the wobbling frequency is a frequency sufficiently higher than the frequency band of the tracking servo.

Further, the photodetector 41 includes, as shown in the FIG. 13 mentioned above, for example, four detector sections 41a, 41b, 41c, 41d, wherein the outside detector sections 41a, 41d have the same area and the inside detector sections 41b, 41c have the same area. In addition, the outside detector sections 41a, 41d are caused to be greater than the inside detector sections 41b, 41c, and the detector sections 41a, 41b and the detector sections 41c, 41d are disposed symmetrically with the center of the track being put therebetween.

Figure 14:
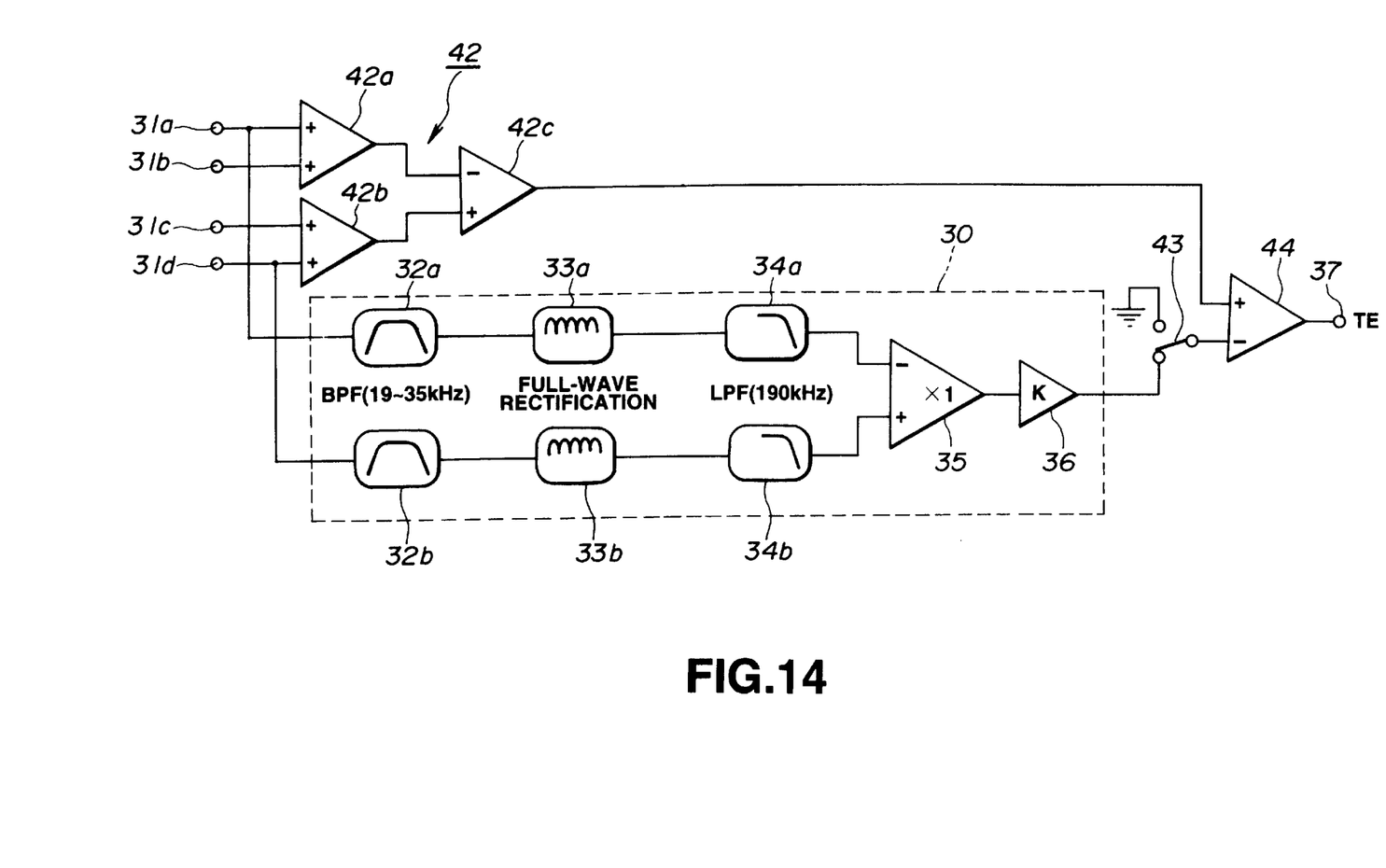
FIG. 14 is a view showing a more practical circuit configuration of an offset component extracting circuit constituting the tracking servo apparatus.

The push-pull circuit 42 takes differences between respective output signals of the detector sections 41a, 41b, 41c, 41d to thereby generate a tracking error signal TE' including the offset component. In more practical sense, the push-pull circuit 42 includes, as shown in FIG. 14, for example, an amplifier 42a for adding respective output signals of the detector sections 41a, 41b, an amplifier 42b for adding respective output signals of the detector sections 41c, 41d, and a differential amplifier 42c for determining a difference between respective output signals of the amplifiers 42a, 42b.

More particularly, the amplifier 42a adds an output signal of the detector section 41b delivered through a terminal 31a and an output signal of the detector section 41b delivered through a terminal 31b to deliver the added output to the differential amplifier 42c. On the other hand, the amplifier 42b adds an output signal of the detector section 41c delivered through a terminal 31c and an output signal of the detector section 41d delivered through a terminal 31d to deliver the added output to the differential amplifier 42c.

The difference amplifier 42c subtracts an output signal of the amplifier 42a from an output signal of the amplifier 42b to deliver its output signal to the differential amplifier 44. Namely, when respective output levels of detector sections 41a, 41b, 41c, 41d are respectively indicated by A, B, C, D, the push-pull circuit 42 calculates a tracking error signal TE' indicated by the following formula (1) by the push-pull method to deliver it to the difference amplifier 44.

$$TE'=(C+D)-(A+B) \quad (1)$$

It is to be noted that amplifiers 42a, 42b may be omitted to deliver respective output signals of the detector sections 41a, 41d directly to the difference amplifier 42c. In this case, the tracking error signal TE' is expressed by the following formula (2).

$$TE'=-D-A \quad (2)$$

On the other hand, the offset component extracting circuit 30 comprises, as shown in the FIG. 14 mentioned above, band pass filters (hereinafter abbreviated as BPF) 32a, 32b for respectively filtering respective output signals of the detector sections 41a, 41d, rectifying circuits 33a, 33b for allowing respective output signals of the BPFs 32a, 32b to respectively undergo full-wave rectification, low pass filters (hereinafter abbreviated as LPF) 34a, 34b for respectively filtering output signals of the rectifying circuits 33a, 33b, a differential amplifier 35 for determining a difference between respective output signals of the LPFs 34a, 34b, and an amplifier 36 for multiplying an output signal from the differential amplifier 35 by K.

The BPFs 32a, 32b have, e.g., a pass-band of 19 kHz to 35 kHz corresponding to the wobble component. More particularly, the BPF 32a allows an output signal of the detector section 41a delivered through the terminal 31a to undergo filtering to extract wobble component to deliver the wobble component to the rectifying circuit 33a. In addition, the BPF 32b allows an output signal of the detector 41d delivered through the terminal 31d to undergo filtering to extract wobble component to deliver the extracted wobble component to the rectifying circuit 33b.

The rectifying circuits 33a, 33b respectively allow wobble components from the BPFs 32a, 32b to undergo full-wave rectification to thereby generate respective signals indicating levels of wobble components respectively detected at the detector sections 41a, 41b to deliver them to the LPFs 34a, 34b.

The LPFs 34a, 34b are composed of a low pass filter having cut-off frequency of, e.g., 190 kHz, and are operative to eliminate high frequency components of respective wobble components from the rectifying circuits 33a, 33b to deliver the signals thus obtained to the differential amplifier 35. Namely, when respective levels of wobble components respectively detected at the detector sections 41a, 41d in the state where tracking servo is applied are assumed to be Aw and Dw, the differential amplifier 35 calculates an offset component indicated by (Dw–Aw) to deliver it to the amplifier 36.

The amplifier 36 multiplies the offset component delivered from the differential amplifier 35 by K to deliver the offset component multiplied by K to the differential amplifier 44 through the select switch 43 which selects an output of the amplifier 36 at the time point when a predetermined time is passed after the tracking servo is started when the switching signal is at L level. The differential amplifier 44 subtracts the offset component multiplied by K delivered from the amplifier 36 from the tracking error signal TE' delivered from the push-pull circuit 42 to determine a tracking error signal TE from which the offset component indicated by the following formula (3) or (4) has been eliminated to deliver the tracking error signal TE thus obtained to the select switch 46.

$$TE=(C+D)-(A+B)-K(Dw-Aw) \quad (3)$$

$$TE=(D-A)-K(Dw-Aw) \quad (4)$$

On the other hand, when the switching signal is at H level, the differential amplifier 44 delivers, to the track on circuit 45, a tracking error signal TE' in which the offset component from the push-pull circuit 42 is included. It is to be noted that gain K of the amplifier 36 is set to a value at which the offset component can be optimumly eliminated from the tracking error signal TE'. In addition, the technology for eliminating the offset component from the tracking error signal by using the wobble component is known art.

On the other hand, as described above, at the time of track jump or seek, i.e., as shown in the FIG. 15B mentioned above, for example, when the servo command signal is at H level, the track counting unit 20 precisely counts the number of tracks that spot of the light beam traverses to deliver the number of tracks to the system controller 61.

The track on circuit 45 includes offset component extracting circuit 12 to differential amplifier 14 of the tracking servo unit shown in the FIG. 6 mentioned above. As described above, the track on circuit 45 delivers, to the select switch 46, a tracking error signal TE from which the offset component has been eliminated when the tracking servo is turned ON, i.e., when the servo command signal changes from H level to L level as shown in the FIG. 15B, for example.

As described above, the select switch 46 is operative so that when the tracking servo is in ON state, it selects a tracking error signal TE from which the offset component from the differential amplifier 44 has been eliminated to deliver it to the switch 15, and after the tracking servo is brought into OFF state, for a time period during which the select signal is at H level, it selects a tracking error signal TE from which the offset component from the track on circuit 45 has been eliminated to deliver it to the switch 15.

As described above, the switch 15 is operative so that when the tracking servo is in ON state, it closes the loop of the feedback system, and when the tracking servo is in OFF state, it opens the loop of the feedback system.

As described above, the tracking control circuit 16 drives, e.g., the biaxial device of the optical pick-up on the basis of the tracking error signal TE delivered through The switch 15. Namely, the tracking control circuit 16 is operative so that for a predetermined time period after the servo command signal changes from H level to L level, it carries out tracking servo control by using the tracking error signal TE from which the offset component from the track on circuit 45 has been eliminated, and after the predetermined time has been passed, it carries out tracking servo control by using the tracking error signal TE from which the offset component from the differential amplifier 44 has been eliminated.

Meanwhile, the offset component extracting circuit 30 cannot precisely detect the wobble component unless the disc unit is in on-track state. Namely, during track jump, the circuit 30 cannot extract the offset component. Moreover, since tracking servo apparatus includes BPFs 32a, 32b and LPFs 34a, 34b as described above, it takes much time until the offset component is precisely extracted after the tracking servo is turned ON, i.e., until it normally operates. However, in the tracking servo apparatus to which this invention is applied, an approach is employed as described above such that for a predetermined time after the servo command signal changes from H level to L level, the tracking error signal TE from which the offset component from the track on circuit 45 has been eliminated is used to carry out tracking servo control, and that after the predetermined time is passed, the tracking error signal TE from which the offset component from the differential amplifier 44 has been eliminated is used to carry out tracking servo control. Accordingly, in addition to the effect of the tracking servo apparatus 10 which has been described with reference to the FIG. 6 mentioned above, even if after spot of light beam is caused to be precisely in on-track state, position of the objective (object lens) is moved followed by the tracking, it is possible to precisely carry out tracking servo control. In addition, also in this case, it is possible to carry out tracking servo control by one spot. Accordingly, this control system is particularly effective, e.g., in the magneto-optical disc unit, etc. in which there is no effective method of canceling, at all times, the offset component of the tracking error signal by the push-pull method.

What is claimed is:

1. A tracking servo apparatus for an optical recording medium, comprising:

a light detector including at least two detecting sections disposed with the center of a track of the optical recording medium being put therebetween;

tracking error signal generating means for taking a difference between output signals from the respective detecting sections of the light detector to thereby generate a tracking error signal;

extracting means for extracting an offset component from an output signal from the tracking error signal generating means;

holding means for holding the offset component outputted from the extracting means;

offset eliminating means for eliminating, on the basis of the offset component from the holding means, the offset component in the tracking error signal from the tracking error signal generating means; and tracking control means for carrying out tracking servo on the basis of an output signal from the offset eliminating means, the holding means holding the offset component outputted from the extracting means in response to switching of the operating state of the tracking control means from a tracking-off state to a tracking-on state and outputting the offset component output from the offset extracting means when the tracking control means is in the tracking-off state.

2. A tracking servo apparatus for an optical recording medium as set forth in claim 1, the extracting means comprising:

a peak hold circuit for carrying out peak hold of a tracking error signal from the tracking error signal generating means;

a bottom hold circuit for carrying out bottom hold of the tracking error signal from the tracking error signal generating means;

operation means for determining an average value of an output signal of the peak hold circuit and an output signal of the bottom hold circuit on the basis of an output signal from the peak hold circuit and an output signal from the bottom hold circuit.

3. A tracking servo apparatus for an optical recording medium as set forth in claim 1, wherein the extracting means is comprised of a low-pass filter.

4. A tracking servo apparatus for an optical recording medium as set forth in claim 1, which further comprises:

second offset eliminating means operative when the tracking control operation is in the inoperating state, for eliminating the first offset component of the tracking error signal from the tracking error signal generating means; and switching means for selectively delivering, to the tracking control means, an output signal from the offset eliminating means and an output signal from the second offset eliminating means.

5. A tracking servo apparatus for an optical recording medium as set forth in claim 4, wherein the switching means delivers an output signal from the first offset eliminating means, in place of an output signal from the second offset eliminating means, to the tracking control means at the time point when a predetermined time is passed after the tracking operation by the tracking control means is started.

6. A tracking servo apparatus for an optical recording medium, comprising:

a light detector having at least two detecting sections disposed with the center of a track of the optical recording medium being put therebetween, and adapted to detect, by the two detecting sections, a return light beam from the optical recording medium of a single light beam irradiated in the state converged onto the track of the optical recording medium;

tracking error signal generating means for taking a difference between output signals from the light detecting sections to thereby generate a tracking error signal;

extracting means for extracting an offset component from an output signal from the tracking error signal generating means;

holding means for holding the offset component outputted from the extracting means;

offset eliminating means for eliminating, on the basis of the offset component from the holding means, the offset component in the tracking error signal from the tracking error signal generating means; and tracking control means for carrying out tracking control of a single light beam irradiated onto the optical recording medium on the basis of an output signal from the offset eliminating means;

wherein when the operating state of the tracking control means is switched from a tracking-off state to a tracking-on state, the holding means holds the offset component outputted from the extracting means, and when the operating state of the tracking control means is in the tracking-off state, the holding means outputs the offset component output from the offset extracting means.

7. A tracking servo apparatus for an optical recording medium as set forth in claim 6, wherein the extracting means comprises:

a peak hold circuit for carrying out peak hold of a tracking error signal from the tracking error signal generating means;

a bottom hold circuit for carrying out bottom hold of the tracking error signal from the tracking error signal generating means;

operation means for determining an average value of an output signal from the peak hold circuit and an output signal from the bottom hold circuit on the basis of an output signal from the peak hold circuit and an output signal from the bottom hold circuit.

8. A tracking servo apparatus for an optical recording medium as set forth in claim 6, wherein the extracting means is comprised of a low pass filter.

9. A tracking servo apparatus for an optical recording medium, comprising:

a light detector including at least two detecting sections disposed with the center of a track of the optical recording medium being put therebetween;

tracking error signal generating means for taking a difference between output signals from the respective detecting sections of the light detector to thereby generate a tracking error signal;

extracting means for extracting an offset component from an output signal from the tracking error signal generating means;

holding means for holding the offset component outputted from the extracting means;

offset eliminating means for eliminating, on the basis of the offset component from the holding means, the offset component in the tracking error signal from the tracking error signal generating means;

tracking control means for carrying out tracking servo on the basis of an output signal from the offset eliminating means;

control means for controlling the tracking control means, the control means outputting a command signal to switch the operating state of the tracking control means from a tracking-off state to a tracking-on state; and switching means for outputting the output signal from the offset eliminating means to the tracking control means in response to receiving the command signal to switch the operating state of the tracking control means from a tracking-off state to a tracking-on state, the holding means holding the offset component outputted from the extracting means in response to receiving the command signal to switch the operating state of the tracking control means from a tracking-off state to a tracking-on state in and outputting the offset component output from the offset extracting means when the tracking control means is in the tracking-off state.

10. A tracking servo apparatus for an optical recording medium as set forth in claim 9, the extracting means comprising:

a peak hold circuit for carrying out peak hold of a tracking error signal from the tracking error signal generating means;

a bottom hold circuit for carrying out bottom hold of the tracking error signal from the tracking error signal generating means;

operation means for determining an average value of an output signal of the peak hold circuit and an output signal of the bottom hold circuit on the basis of an output signal from the peak hold circuit and an output signal from the bottom hold circuit.

11. A method of tracking a track on an optical recording medium, comprising:

detecting light by a light detector including at least two sections disposed with the center of a track of the optical recording medium being put therebetween;

generating means for taking a difference between output signals from the respective detecting sections of the light detector to thereby generate a tracking error signal;

extracting by an extracting means, an offset component from an output signal from the tracking error signal generating means;

holding the offset component outputted from the extracting means;

eliminating, on the basis of the offset component from the holding means, the offset component in the tracking error signal from the tracking error signal generating means;

carrying out tracking servo by a tracking control means on the basis of an output signal from the offset eliminating means;

holding the offset component outputted from the extracting means in response to switching of the operating state of the tracking control means from a tracking-off state to a tracking-on state and outputting the offset component output from the offset extracting means when the tracking control means is in the tracking-off state.

\* \* \* \* \*